W. S. NICHOLSON.
AUTOMATIC TRIPLE VALVE FOR BRAKE MECHANISMS.
APPLICATION FILED JUNE 26, 1908.
996,117.
Patented June 27, 1911.
2 SHEETS—SHEET 2.
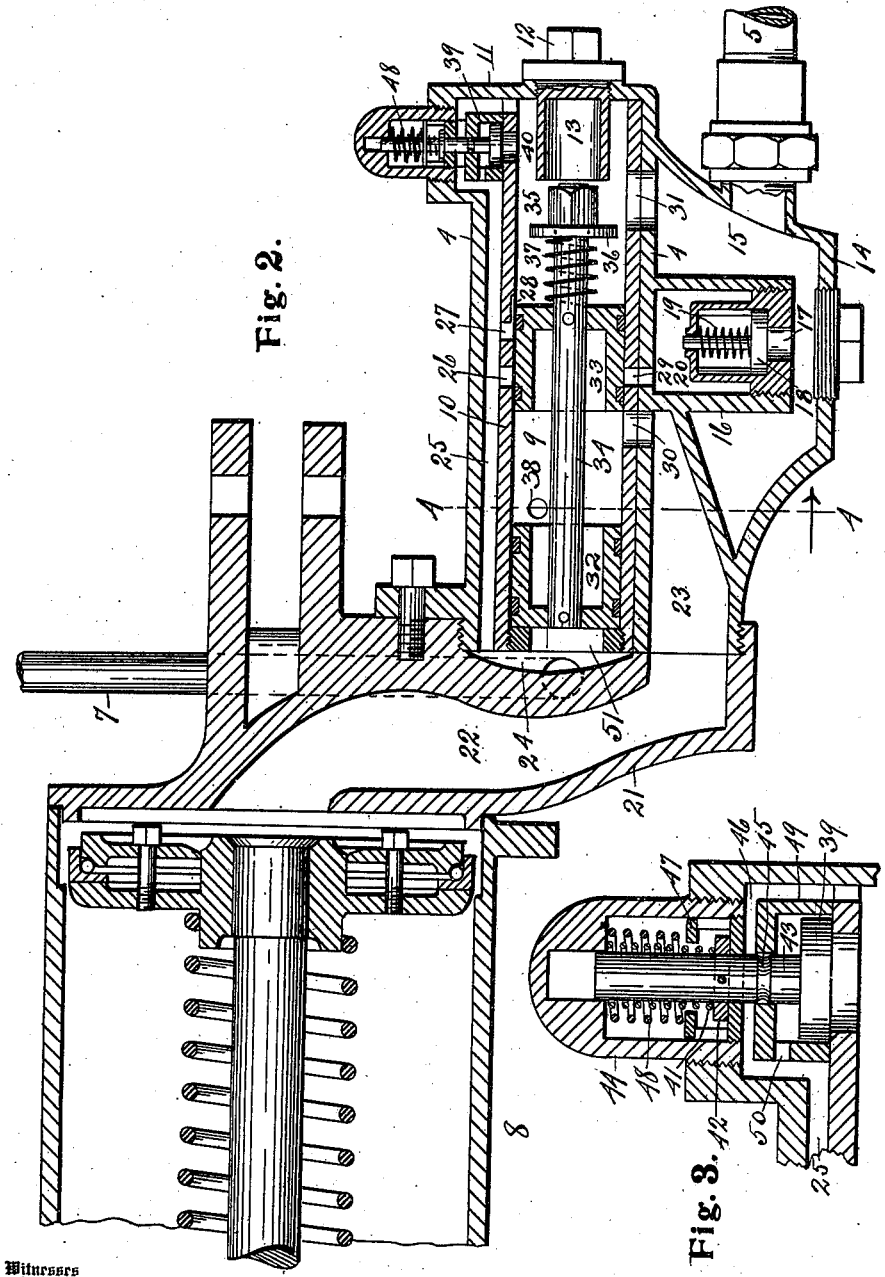

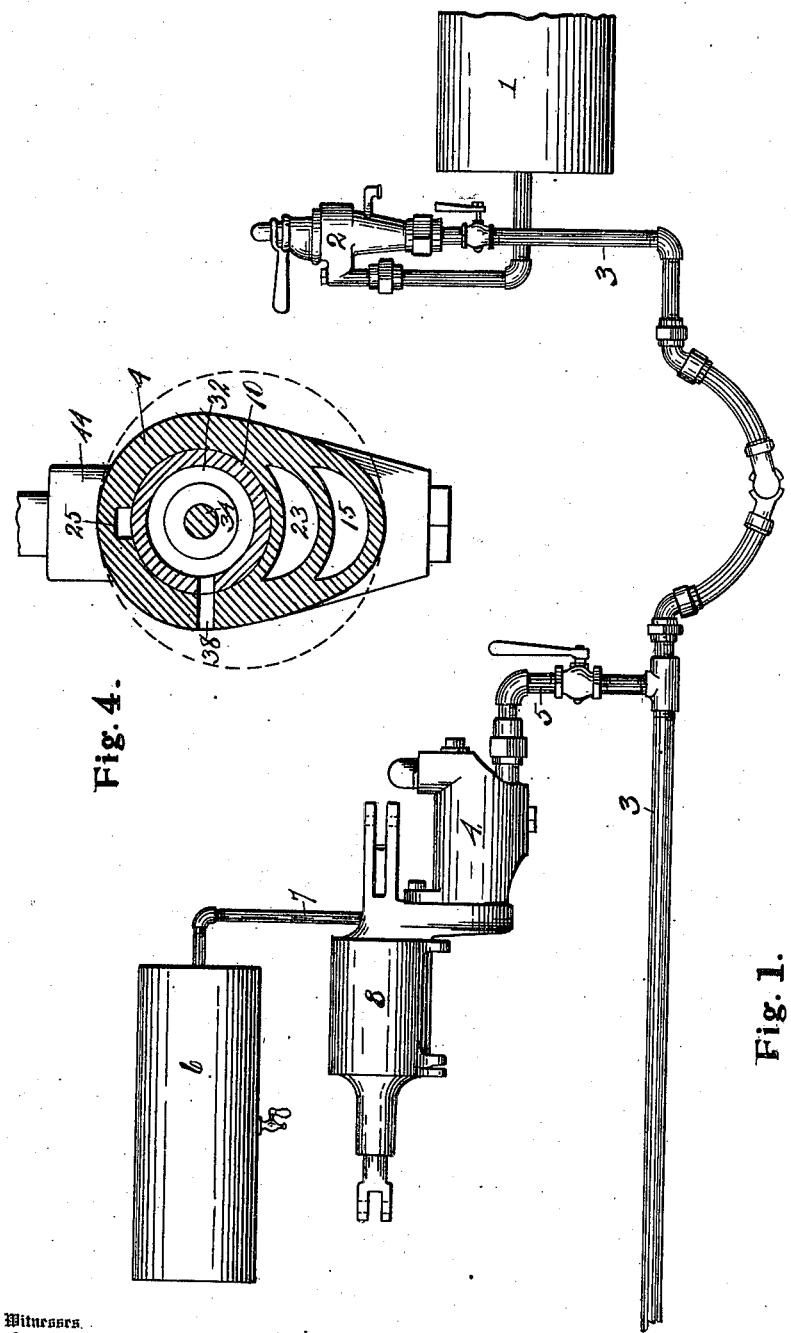

UNITED STATES PATENT OFFICE.

WESLEY S. NICHOLSON, OF NOVI, MICHIGAN, ASSIGNOR OF ONE-HALF TO BURTON HOGLE, OF DETROIT, MICHIGAN.

AUTOMATIC TRIPLE VALVE FOR BRAKE MECHANISM.

996,117.  Specification of Letters Patent.  Patented June 27, 1911.

Application filed June 26, 1908. Serial No. 440,568.

*To all whom it may concern:*

Be it known that I, WESLEY S. NICHOLSON, a citizen of the United States, residing at Novi, in the county of Oakland and State of Michigan, have invented a new and useful Improvement in Automatic Triple Valves for Brake Mechanism, of which the following is a specification.

This invention relates to triple valves for air brake mechanism, and consists in the construction and arrangement of parts hereinafter more fully set forth and pointed out particularly in the claims.

The object of the invention is to provide simple and efficient means for facilitating the application and release of air brakes, wherein the arrangement is such as to enable an application of the brakes to be made with any desired degree of force with a minimum reduction in train pipe pressure.

The above object is attained by the mechanism illustrated in the accompanying drawings, in which:—

Figure 1 is a general view, showing a portion of the main reservoir, the engineer's valve connected to said reservoir, a portion of the train pipe connected to the engineer's valve, the triple valve connected to the train pipe, the auxiliary reservoir, and the brake cylinder connected with the auxiliary reservoir through the triple valve. Fig. 2 is an enlarged sectional view through the triple valve and one end of the brake cylinder. Fig. 3 is an enlarged detail in section of a check valve which controls the flow of air through the triple valve to the auxiliary reservoir. Fig. 4 is a transverse section as on line 4—4 of Fig. 2.

Referring to the characters of reference, 1 designates the main reservoir, 2 the engineer's valve, of common construction connected therewith, 3 the train pipe connected with the engineer's valve, 4 the valve case of the triple valve connected through pipe 5 with the train pipe, 6 the auxiliary reservoir connected by pipe 7 with the triple valve, and 8 the brake cylinder which is connected through the triple valve with the auxiliary reservoir.

Within the valve case 4 of the triple valve is the main valve chamber 9 which is lined with a cylindrical bushing of brass 10 within which the pistons of the triple valve are adapted to reciprocate, said brass cylinder being open at its ends and the chamber formed therein communicating at one end with the auxiliary reservoir through the pipe 7, and at the oher end with the train pipe through the pipe 5. In the end 11 of the valve case 4 is a plug 12 carrying the tubular portion 13 which projects into the valve chamber 9. Secured to or formed integral with the valve case and depending from the lower side thereof is a supplementary case 14 having therein an auxiliary valve chamber 15 into which depends a housing 16 from the wall of the case 4. Seated in said housing and controlling the port 17 therein is a check valve 18 whose stem is encircled by a light coiled spring 19 which is confined thereon between the disk of said valve and the yoke 20 which serves as a guide for the valve stem.

The triple valve case is connected with the brake cylinder by means of a suitable coupling 21 in which is a passageway 22 leading at one end into the brake cylinder, and at the other end communicating with the passage 23 in the triple valve case. Formed in the outer face of the fitting 21 is a concaved recess 24, the curved wall of which forms the inner end of the valve chamber 9 and with which the pipe 7 leading to the auxiliary reservoir communicates.

In the upper wall of the case 4 is a passage way 25 the lower side of which is closed by the bushing 10, said bushing having therein the ports 26 and 27 respectively, which establish communication between said passage 25 and the valve chamber 9. Formed in the wall of the bushing 10 and connecting the port 27 with the chamber 9 is a feed groove 28. Establishing communication between the valve chamber 9 and the check valve 18 is a port 29 which is formed through the lower side of the bushing 10 and through the lower wall of the case 4. Connecting the passage 23 and the chamber 15 with the valve chamber 9 are the passages 30 and 31 respectively which are formed through the lower wall of the valve case and through the lower side of the bushing of said valve chamber.

The triple valve which is adapted to reciprocate within the chamber 9 is a double piston valve, the pistons 32 and 33 of which are connected by a rod 34 which rod extends through the piston 33 and receives upon its outer end a nut 35. Mounted to slide upon said rod and normally engaging the nut 35 is a collar 36 which is retained in position by a coiled spring 37 which embraces the end of the rod 34 and is confined between said collar and the end of the piston 33. The pistons are of such length as to enable the piston 33 by its travel, to open and close the ports 26, 27, 29 and the feed groove 28, and the piston 32 by its travel to successively open and close the exhaust port 38 which is formed through the bushing and outer case and which leads from chamber 9 to the outside of the case.

In the operation of this device, when making a service application, a portion of the air is exhausted from the train pipe by the operation of the engineer's valve in the usual way. The pressure in the auxiliary reservoir then being in excess of the train pipe pressure, the triple valve will be moved to the right until arrested by the collar 36 engaging the inner end of the tubular portion 13 of the plug 12. This movement of the triple valve will cause the piston 32 to close the exhaust port 38 and the piston 33 to close the feed groove 28 and open the ports 26 and 29. Air from the auxiliary reservoir will then enter the valve chamber 9 through the port 26 and from said chamber will pass to the brake cylinder through passages 22, 23, and 30, actuating the piston therein and making an application of the brakes in the ordinary manner. As soon as the pressure in the auxiliary reservoir falls slightly below that of the train pipe, air will also enter the brake cylinder from the train pipe by lifting the valve 18 and enter chamber 9 through the port 29 and passing to the brake cylinder through the passage 30. By this arrangement it will be noted that the train pipe and the auxiliary reservoir are connected with the brake cylinder through the valve chamber of the triple valve and between the pistons thereof, whereby the valve remains balanced after the initial movement to effect the service application, obviating a return of the triple valve to its initial or normal position by an inadvertent preponderance of pressure in the train pipe before the completion of the operation of applying the brakes.

In making an emergency application where the full braking force is required, the pressure in the train pipe is so reduced by a manipulation of the engineer's valve as will be well understood, as to cause the preponderance of pressure from the auxiliary reservoir acting upon the piston 32 to move the triple valve to the right to the limit of its movement, compressing the spring 37 and causing the end of the rod to pass through the collar 36 and enter the tubular portion 13 until arrested by the nut on said rod striking the plug 12. This extreme movement of the triple valve will open the port 27 as well as the port 26 and allow a greater volume of air to pass into the brake cylinder as before described. In this extreme movement of the triple valve, the port 29 remains open so that after the pressure in the auxiliary reservoir and the train pipe becomes nearly equalized, air from the train pipe will enter the brake cylinder in the manner before described when making a service application.

To release the brakes, the normal train pipe pressure is restored by admitting air thereto from the main reservoir through the engineer's valve in the usual way; the pressure in the train pipe will then be in excess of that in the auxiliary reservoir and said increased pressure acting upon the end of piston 33 through the chamber 15 and passage 31, will move the triple valve to the left, causing the piston 32 to open the exhaust port and permitting the air to escape from the brake cylinder. The travel of the triple valve to the left will cause piston 33 to close ports 26, 27 and 29 and open the feed groove 28. Upon the return of the triple valve to its normal or running position, the auxiliary reservoir is recharged by air passing from the train pipe into chamber 15, thence through passage 31 to chamber 9, and from said chamber through the feed groove 28 to passage 25 which communicates with the pipe 7 leading to the auxiliary reservoir. Should the pressure in the auxiliary reservoir be considerably lower than normal train pipe pressure, upon the return of the triple valve to the running position, the greater pressure in the train pipe end of the triple valve chamber will act upon the check valve 39 through the port 40 over which said valve is normally seated, and raise said valve against the action of the inner spring 41 which is confined between a collar 42 fixed on the stem 43 of said valve, and the upper end of the case 44 through which said stem passes. This initial movement of the valve 39 will cause the circumferential groove 45 in the stem thereof to register with the passage way 46 connecting the outer end of the passage 25 with the train pipe end of the valve chamber 9, permitting the air to flow from said valve chamber through the passage 46 and into the passage 25, and thence to the auxiliary reservoir. Should the pressure in the train pipe rise above the normal, such excessive pressure in the train pipe end of the triple valve chamber acting upon the valve 39 will raise said valve still farther to carry the collar 42 forcibly against the loose collar 47 which surrounds the valve stem and raise said last mentioned collar upwardly against the resistance of the spring 48 which bears thereon, permitting such vertical travel of the valve stem 43 as to carry the circumferential channel 45 therein above the passage 46, whereby said passage becomes closed by the valve stem, and a further flow of air therethrough is stopped, preventing the overcharging of the auxiliary reservoir. In the housing 49 which surrounds the valve 39 is a port 50 above said valve communicating with the passage 25. By this arrangement provision is made for supplying auxiliary reservoir pressure to the upper side of said valve, and train pipe pressure to the lower side thereof, whereby said valve is held firmly to its seat, obviating leakage therethrough should the train pipe pressure be greatly reduced through the breaking of the train pipe, or any other cause. Check valve 18 will also close upon the breaking of the train pipe, thereby preventing the escape of air from the auxiliary reservoir therethrough.

The area of the valve chamber 9 is contracted at the auxiliary end of said chamber by means of the threaded ring 51 which is screwed into the end of the bushing forming said chamber. By this arrangement when the triple valve is in the normal or running position, the greater area at the opposite end of said valve exposed to the train pipe pressure will hold said valve in the position of release and prevent it creeping to the right.

By means of the feed groove 28, slight variations in the train pipe pressure will be equalized with the pressure in the auxiliary reservoir, preventing a possible preponderance of pressure upon the auxiliary end of the triple valve and an inadvertent actuation of said valve.

Having thus fully set forth my invention what I claim as new and desire to secure by Letters Patent, is:—

1. In an automatic fluid-pressure brake apparatus in combination with a main reservoir, an auxiliary reservoir, a brake-cylinder and a train-pipe, a valve casing, an inner bushing, a double piston reciprocating valve the connecting rod of which extends beyond the right or train-pipe head of said valve on which is carried a graduating spring, a movable collar and a nut to hold said spring in position, a main chamber, a supplemental chamber inclosing a chek or non-return valve, an air passage between said casing and said bushing connecting main chamber with auxiliary reservoir, a combination check device controlling said air passage, and ports and passages piercing said bushing and adapted to connect an auxiliary reservoir with a brake-cylinder and with a train-pipe substantially as set forth.

2. In a brake mechanism, the combination of a chamber or casing having direct connection with a brake cylinder and a train pipe respectively, the wall of said casing having an exhaust port therethrough, a double piston reciprocating valve whose piston heads are rigidly connected, said valve being adapted to be actuated by pressure from an auxiliary reservoir in a direction to cause one head to cover said exhaust port and exclude therefrom the pressure from the auxiliary reservoir and from the train pipe in making an application of brakes.

3. In a brake mechanism, the combination of a chamber or casing having direct connection to a brake-cylinder and to a brake-pipe, respectively, a double piston reciprocating valve which is actuated by pressure from an auxiliary reservoir in direction to open a service port to admit air from auxiliary reservoir to main chamber between piston heads, said space between the two piston heads being always in communication with passage leading from said main chamber to and from brake-cylinder, substantially as set forth.

4. In a brake mechanism, the combination of a casing having a valve chamber therein, a brake cylinder and a train pipe with which said chamber is directly connected, a double piston reciprocating valve in said chamber adapted to be actuated by pressure from an auxiliary reservoir, the wall of the chamber having ports therein which establish communication between the train pipe and the brake cylinder, and between the brake cylinder and the auxiliary reservoir, the movement of said valve opening said ports whereby air from the auxiliary reservoir and from the train pipe is simultaneously admitted to the brake cylinder through the valve chamber between the pistons of said valve.

5. In a brake mechanism, the combination of a casing having a valve chamber therein, said chamber being connected directly to a brake cylinder and to a train pipe, a reciprocating piston valve within said chamber, an auxiliary reservoir having communication with the end of the valve chamber for the purpose of actuating said valve, the wall of the valve chamber having a service port and an emergency port communicating with the auxiliary reservoir, the piston valve normally closing said ports, means for limiting the movement of the valve upon a minimum reduction of pressure in the train pipe to open the service port only, said means permitting a further movement of said valve upon a maximum reduction of pressure in the train pipe to open said emergency port, the wall of the valve chamber having a passage communicating with said ports and with the brake cylinder.

6. In a brake mechanism, the combination of a casing having a valve chamber therein, said chamber being connected directly to a brake cylinder and to a train pipe, a double piston reciprocating valve in said chamber, an auxiliary reservoir, the wall of the chamber having a feed groove which is open when the valve is in its normal position and which communicates with the auxiliary reservoir and with the train pipe for re-charging the auxiliary reservoir, there being a second re-charging passage in the wall of the casing leading from one end of the valve chamber to the auxiliary reservoir, a valve controlling said re-charging passage, and means for connecting the auxiliary reservoir with the end of said double piston valve.

7. In a brake mechanism, the combination of a casing having a valve chamber therein, said chamber being connected directly to a brake cylinder and to a train pipe, an auxiliary reservoir, a double piston reciprocating valve in said chamber, the wall of the chamber having a passage connecting said chamber with the brake cylinder and having ports connecting said chamber with the auxiliary reservoir which ports and passage communicate with said chamber between the pistons of said valve, said ports being normally covered by a piston valve when the valve is in the running position, and means connecting one end of the valve chamber with the auxiliary reservoir.

8. In a brake mechanism, the combination of a casing having a valve chamber therein, said chamber being connected directly to a brake cylinder and to a train pipe, an auxiliary reservoir connected with one end of said valve chamber, a double piston valve in said chamber, the wall of the chamber having service and emergency ports connecting said chamber with the auxiliary reservoir, and having a passage connecting said chamber with the brake cylinder, said chamber also having an exhaust port leading therefrom, said double piston valve by a movement in one direction being adapted to close the exhaust port and open said service ports, and being adapted by a movement in the opposite direction to close said service ports and open said exhaust port to afford a direct passage from the brake cylinder through the valve chamber between said pistons to the atmosphere.

9. In a brake mechanism, the combination of a casing having a valve chamber therein, said chamber being connected at one end to a brake cylinder, and at the other end to a train pipe, an auxiliary reservoir connected to the brake cylinder end of said chamber, a piston valve in said chamber for controlling the passage of air from the auxiliary reservoir to the brake cylinder, the wall of said casing having an air feed passage way therein which at one end communicates with the auxiliary reservoir, and at the other end with the train pipe end of said valve chamber, and a spring-restrained valve communicating with the train pipe end of said valve chamber and controlling the flow of air through said air feed passage way.

WESLEY S. NICHOLSON.

Witnesses:
 BURTON HOGLE,
 MAUDE M. GATES.

---

Copies of this patent may be obtained for five cents each, by addressing the "Commissioner of Patents, Washington, D. C."